United States Patent
Akopian et al.

(10) Patent No.: US 7,336,696 B2
(45) Date of Patent: Feb. 26, 2008

(54) ACQUISITION OF A CODE MODULATED SIGNAL

(75) Inventors: David Akopian, Tampere (FI); Seppo Turunen, Tampere (FI); Samuli Pietila, Tampere (FI); Harri Valio, Kämmenniemi (FI)

(73) Assignee: Nokia Siemens Networks Oy, Espoo (FI)

( * ) Notice: Subject to any disclaimer, the term of this patent is extended or adjusted under 35 U.S.C. 154(b) by 712 days.

(21) Appl. No.: 10/734,739

(22) Filed: Dec. 12, 2003

(65) Prior Publication Data

US 2005/0129146 A1 Jun. 16, 2005

(51) Int. Cl.
*H04B 1/69* (2006.01)
(52) U.S. Cl. ...................................... 375/134
(58) Field of Classification Search ................ 375/134, 375/130, 149, 150, 148; 342/357
See application file for complete search history.

(56) References Cited

U.S. PATENT DOCUMENTS

| | | | |
|---|---|---|---|
| 6,181,911 B1 | 1/2001 | Gilbert et al. | |
| 6,343,094 B1 * | 1/2002 | Yamamoto | 375/152 |
| 6,990,141 B1 * | 1/2006 | Iwasaki | 375/150 |
| 7,130,293 B2 * | 10/2006 | Hanada et al. | 370/342 |
| 2002/0015456 A1 | 2/2002 | Norman et al. | |
| 2003/0137996 A1 * | 7/2003 | Roh et al. | 370/491 |
| 2004/0047439 A1 * | 3/2004 | Kaewell et al. | 375/349 |
| 2004/0176099 A1 | 9/2004 | Sahai et al. | |

FOREIGN PATENT DOCUMENTS

| | | |
|---|---|---|
| WO | 0201243 | 1/2002 |
| WO | 03023441 | 3/2003 |

* cited by examiner

*Primary Examiner*—Khai Tran

(57) ABSTRACT

The invention relates to an apparatus supporting an acquisition of a received code modulated signal by determining the correlation between the received code modulated signal and an available replica code sequence at different code phases. It is proposed that the apparatus comprises a first acquisition engine for selecting code phases which are good candidates for being the code phase at which a received code modulated signal and an available replica code sequence have the highest correlation. The apparatus further comprises a second acquisition engine for performing a refined comparison between a received code modulated signal and an available replica code sequence for each code phase selected by the first acquisition engine. The invention relates equally to a corresponding method and to a system comprising such an apparatus and a network.

18 Claims, 9 Drawing Sheets

ACQUISITION OF A CODE MODULATED SIGNAL

FIELD OF THE INVENTION

The invention relates to an apparatus supporting an acquisition of a received code modulated signal by determining the correlation between the received code modulated signal and an available replica code sequence at different code phases relative to each other. The invention relates equally to a system and to a method supporting such an acquisition of a received code modulated signal.

BACKGROUND OF THE INVENTION

A code modulated signal has to be acquired for example in CDMA (Code Division Multiple Access) spread spectrum communications.

For a spread spectrum communication in its basic form, a data sequence is used by a transmitting unit to modulate a sinusoidal carrier and then the bandwidth of the resulting signal is spread to a much larger value. For spreading the bandwidth, the single-frequency carrier can be multiplied for example by a high-rate binary pseudo-random noise (PRN) code sequence comprising values of −1 and 1, which code sequence is known to a receiver. Thus, the signal that is transmitted includes a data component, a PRN component, and a sinusoidal carrier component. A PRN code period comprises typically 1023 chips, the term chips being used to designate the bits of the code conveyed by the transmitted signal, as opposed to the bits of the data sequence.

A well known system which is based on the evaluation of such code modulated signals is GPS (Global Positioning System). In GPS, code modulated signals are transmitted by several satellites that orbit the earth and received by GPS receivers of which the current position is to be determined. Each of the satellites transmits two microwave carrier signals. One of these carrier signals L1 is employed for carrying a navigation message and code signals of a standard positioning service (SPS). The L1 carrier signal is modulated by each satellite with a different C/A (Coarse Acquisition) Code known at the receivers. Thus, different channels are obtained for the transmission by the different satellites. The C/A code, which is spreading the spectrum over a 1 MHz bandwidth, is repeated every 1023 chips, the epoch of the code being 1 ms. The carrier frequency of the L1 signal is further modulated with the navigation information at a bit rate of 50 bit/s. The navigation information, which constitutes a data sequence, can be evaluated for example for determining the position of the respective receiver.

A receiver receiving a code modulated signal has to have access to a synchronized replica of the employed modulation code, in order to be able to de-spread the data sequence of the signal. More specifically, a synchronization has to be performed between the received code modulated signal and an available replica code sequence. Usually, an initial synchronization called acquisition is followed by a fine synchronization called tracking. In both synchronization scenarios, a correlator is used to find the best match between the replica code sequence and the received signal and thus to find their relative shift called code phase. The match can be determined for example with chip accuracy. If an accuracy of a fraction of a chip is needed, the chip can be presented by several samples after an analog-to-digital conversion.

During the acquisition, the phase of the received signal relative to the available replica code sequence can have any possible value due to uncertainties in the position of the satellite and the time of transmission of the received signal.

Moreover, an additional frequency modulation of the received signal may occur, which can be as large as +/−6 kHz, for example due to a Doppler effect and/or a receiver clock inaccuracy. The search of the code phase is therefore usually performed with different assumptions on an additional frequency modulation. For a sensitivity increase, a receiver normally uses long integrations that require the frequency uncertainty to be as small as a few Hz. Therefore, even with the aligned code, a large number of frequency assumptions should be checked.

The initial acquisition is thus a two-dimensional search in code phase and frequency. To meet the real time processing and weak signal sensitivity requirements, usually, a massive correlator bank which is able to check in parallel hundreds and thousands of options is employed for implementing the acquisition stage of a receiver.

Each correlator of such a massive correlator bank checks simultaneously another option defined by a specific code phase and a specific frequency of modulation. To this end, each correlator multiplies a received code modulated signal to a predetermined compensating sinusoidal signal, aligns the compensated code modulated signal with the replica code sequence at a predetermined code-phase, multiplies the samples of the compensated code modulated signal and the samples of the replica code sequence element by element and integrates the multiplication results. The integration can be either purely coherent or include a non-coherent stage. In a non-coherent stage, consecutive coherent integration results for a certain number of multiplication results, respectively, are further integrated by summing the absolute or the squared values of these integration results.

If the assumptions on the code-phase and the frequency modulation belonging to one option are correct for the received code modulated signal, then the correlation results in a larger integration value than in the case of a misalignment or an inappropriate compensation of a frequency modulation. Thus, detecting the correlation peak and comparing it with a certain threshold allows to find the correct code phase and the correct frequency of modulation.

A massive correlator bank has the advantage that it is much faster than a sequential search correlator bank, in which the number of correlators is restricted and in which each correlator searches only one candidate at a time. It is a disadvantage of a massive correlator bank, however, that its complexity is significant, if a correlation value is determined for all desired options.

SUMMARY OF THE INVENTION

It is an object of the invention to reduce the complexity of massive acquisition engines used for the acquisition of code modulated signals, for example of massive correlator banks.

An apparatus supporting an acquisition of a received code modulated signal by determining the correlation between the received code modulated signal and an available replica code sequence at different code phases relative to each other is proposed. The proposed apparatus comprises a first acquisition engine for selecting code phases which are good candidates for being the code phase at which a received code modulated signal and an available replica code sequence have the highest correlation, and for outputting information on each selected code phase. The proposed apparatus further comprises a second acquisition engine for receiving information on selected code phases from the first acquisition engine and for performing a refined comparison between a received code modulated signal and an available replica code sequence for each selected code phase on which information is received. The acquisition engines can be in particular, though not exclusively, correlator banks.

Further, a system is proposed which comprises the proposed apparatus and in addition a network. The apparatus and the network are able to exchange data between each other. The exchanged data can be used for supporting the acquisition in various ways.

Finally, a method for supporting an acquisition of a received code modulated signal by determining the correlation between the received code modulated signal and an available replica code sequence at different code phases relative to each other is proposed. The proposed method comprises a first step of selecting code phases which are good candidates for being the code phase at which a received code modulated signal and an available replica code sequence have the highest correlation. The proposed method comprises as a second step performing a refined comparison between the received code modulated signal and the available replica code sequence for each of the selected code phases.

The invention proceeds from the consideration that for a large fraction of search options, a decision can be made with little effort, for example after a short integration length in a cross-correlation. A conventional massive correlator bank will continue nevertheless checking all search options with the entire operation cycle, thus performing unnecessary computations. It is therefore proposed to distribute the calculation resources required for the acquisition of a code modulated signal to two separate acquisition engines.

A first acquisition engine carries out only a preliminary search for all possible options. It does not make a firm decision at each operation cycle but uses for instance a reduced operation cycle for sorting out a large amount of improbable options and for providing several remaining possible options. The duration of such a reduced operation cycle can be fixed or be defined by the operational conditions. The preliminary search can be stopped for example, as soon as a decision can be made for most of the search options. The first acquisition engine can be for example a modified massive correlator bank performing many preliminary searches in parallel.

The first acquisition engine then transfers the task to check the remaining search options in more detail to a second acquisition engine. The second acquisition engine can be a small engine using pipe-lining, for example a modified tracking unit. Thereupon, the first acquisition engine is free to check other possible options in a preliminary way.

It is an advantage of the invention that it allows to reduce the complexity of massive acquisition engines used for the acquisition of code modulated signal, and thereby for example the gate count and the area of a massive correlator bank used conventionally as acquisition engine.

Alternatively, the invention allows to accelerate the processing without increasing the complexity of the acquisition engine and to reduce, for example, the delays in position calculations. For instance, the time to first fix (TTFF) of a position can be reduced to one half or less.

It is further an advantage of the invention that due to the structural separation, the two acquisition engines may use different algorithms and different integration length in order to optimize the processing at each stage.

In some cases, in which assistance is available, for example from some network, it is also possible to use only the second acquisition engine and to keep the first acquisition engine off. Thereby, the power consumption can be reduced in certain assistance applications.

The acquisition engines can be implemented in particular in hardware, while any supplementary processing can be implemented in hardware and/or software. Such supplementary processing can be performed for example by a digital signal processor (DSP) or some other processing unit.

The invention can be employed in particular, though not exclusively, for CDMA spread spectrum transmissions, for instance for a receiver of a positioning system like GPS or Galileo. The proposed apparatus can be for example such a receiver or a device comprising such a receiver, for instance a mobile terminal. In the latter case, part of the processing can be carried out outside of the receiver, for example in the mobile terminal or in a network to which the mobile terminal transmits the required information.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
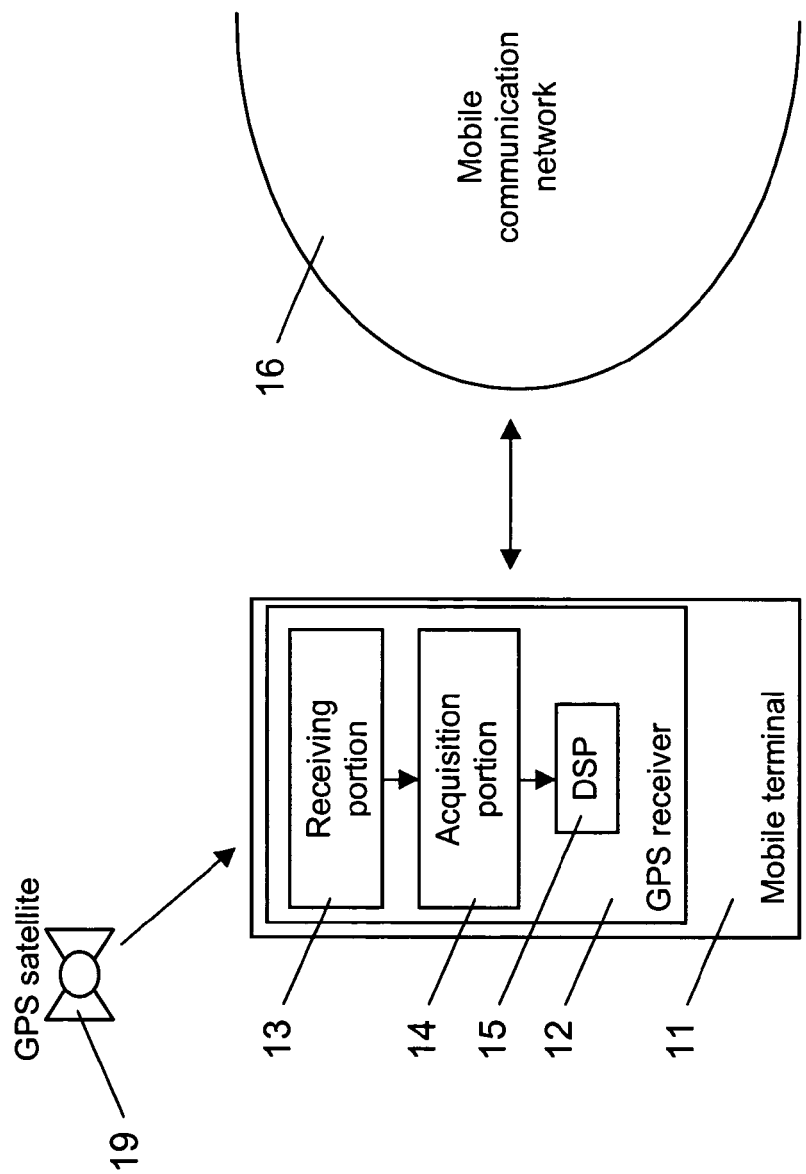
FIG. 1 schematically shows a system in which the invention can be employed.

FIG. 1 schematically presents a system 10 in which the invention can be implemented.

The system comprises a mobile terminal 11 including a GPS receiver 12 and a mobile communication network 16. The GPS receiver 12 includes a receiving portion 13 for receiving code modulated signals from GPS satellites 19, an acquisition portion 14 for acquiring a received code modulated signal, and a digital signal processor (DSP) 15 supporting the acquisition. The mobile communication network 16 may provide assistance data to the acquisition portion 14 using a regular radio-based communication between the mobile terminal 11 and the mobile communication network 16. Alternatively or in addition, the mobile communication network 16 may perform computations for supporting the acquisition of a code modulated signal received by the GPS receiver 12 using a regular radio-based communication between the mobile terminal 11 and the mobile communication network 16.

Figure 2:
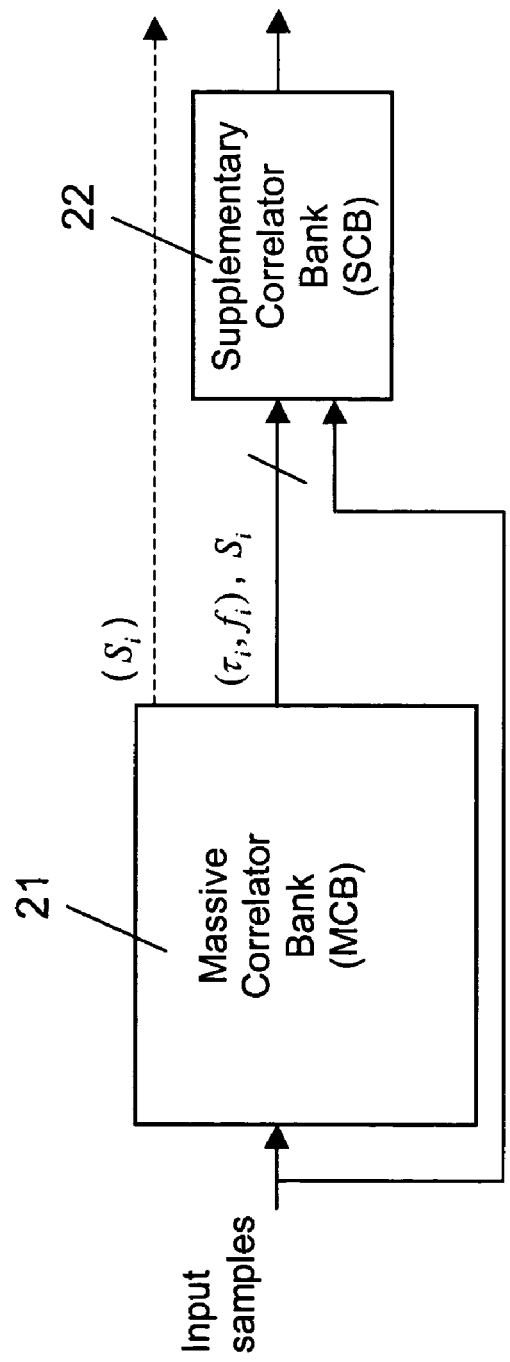
FIG. 2 is a schematic block diagram of a combination of a massive correlation bank and a supplementary correlation bank employed in an embodiment of the invention.

FIG. 2 presents the general structure of the acquisition portion 14 of the GPS receiver 12 of FIG. 1.

The acquisition portion 14 comprises a massive correlator bank MCB 21 and a supplementary correlator bank SCB 22. The receiving portion 13 of the GPS receiver 12 is connected to both correlator banks 21, 22. The massive correlator bank 21 is further connected with several lines to the supplementary correlator bank 22.

Figure 3:
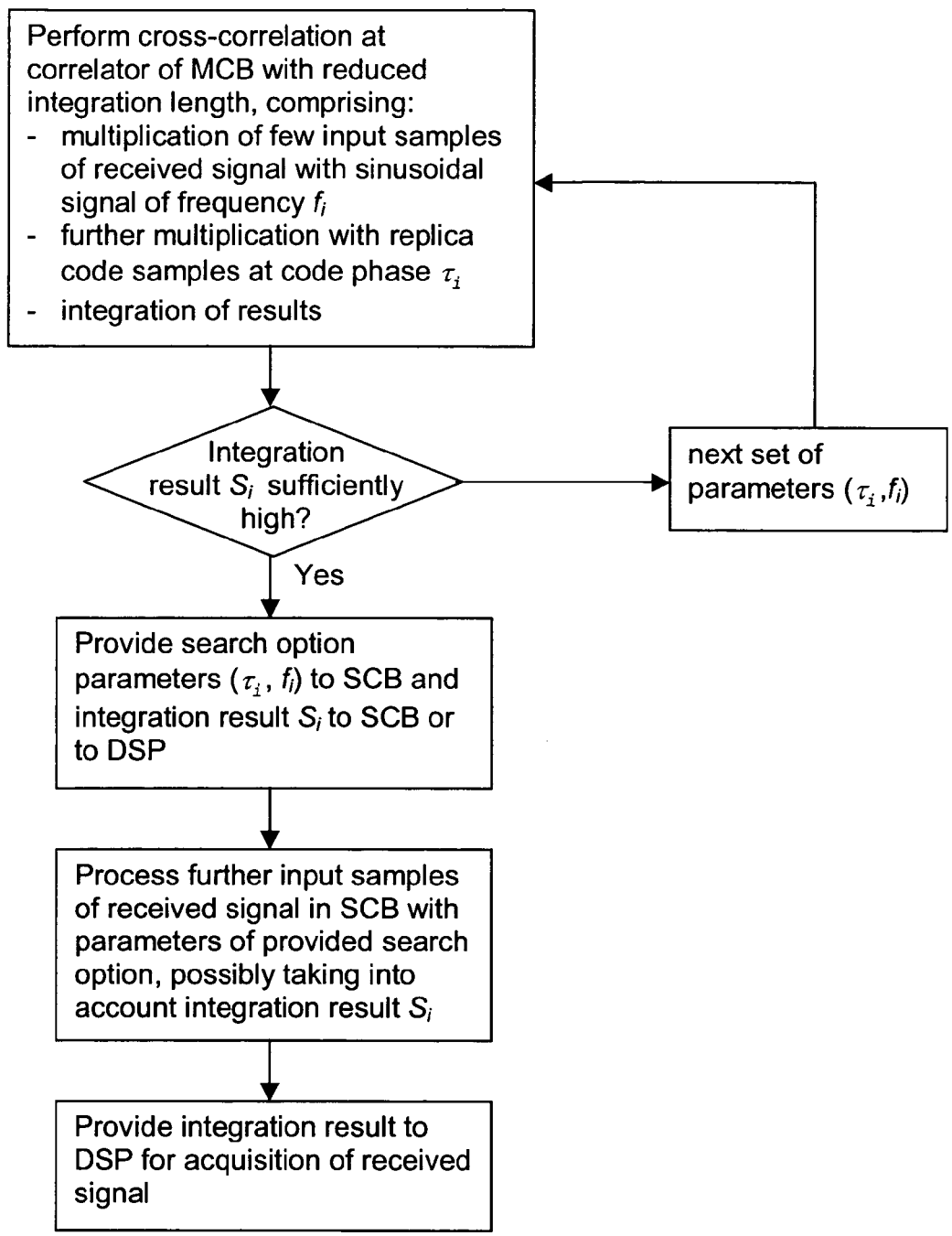
FIG. 3 is a flow chart illustrating the operation of the correlation banks of FIG. 2.

FIG. 3 is a flow-chart illustrating the operation of the acquisition portion 14 of FIGS. 1 and 2.

The massive correlator bank 21 receives from the receiving portion 13 samples of a received code modulated signal and performs a cross-correlation between the received code modulated signal and a replica code sequence with a reduced integration length.

To this end, a correlator of the massive correlator bank 21 multiplies the input samples to a sinusoidal signal for compensating a possible modulation with a selected frequency. The massive correlator bank 21 then aligns the resulting samples with an available replica code sequence at a selected code phase and multiplies predetermined ones of the frequency compensated samples, for example the first ones of the samples, element by element with the respectively aligned sample of the replica code sequence. The number of the predetermined samples is significantly smaller than the number of all samples of the received code modulated signal which are overlapping with the samples of the aligned replica code sequence. It is to be noted that the order of the two different multiplication operations can also be reversed. The multiplication results are integrated coherently, the integration result constituting a first indication of the amount of correlation.

Alternatively, a non-coherent integration could be used. In this case, the multiplication results originating from sections of the received code modulated signal of equal size are integrated separately for each section in a coherent integration. The results of these subcorrelations are multiplied with a shifted, conjugated version of themselves. In a final step, the results of these second multiplications are integrated in a non-coherent integration. Thereby, residual sinusoidal modulations in the raw data, in particular from a Doppler frequency, are reduced.

In either case, the correlation is based on a shorter operation cycle than in correlators of a conventional massive correlator bank.

The massive correlator bank 21 then selects a new set of a frequency and a code-phase, and the correlator continues with the correlation based on this new set.

At the same time, the massive correlator bank 21 checks whether the last integration result indicates that the last assumed frequency modulation and the last employed code-phase could be the correct set of frequency and code-phase and constitutes thus a search option for a refined search. The checking may comprise for example comparing the integration result with a threshold value.

If the set of frequency and code-phase constitute a search option, an indication of the associated frequency $f_i$ and the associated code-phase $\tau_i$ is provided to the supplementary correlator bank 22 using one of the connecting lines. In addition, the associated integration result $S_i$ is either equally provided to the supplementary correlator bank 22 or to a processing unit, for example to the DSP 15 of the GPS receiver 12. The latter alternative is indicated in FIG. 2 by an arrow with a dashed line. The index i is used for identifying the respective option.

The supplementary correlator bank 22 assigns one of its correlators to continue the processing with the received parameters $f_i$, $\tau_i$ and possibly the parameter $S_i$, in order to allow a determination of the code phase and the compensation frequency resulting in the best match between the received code modulated signal and the replica code sequence. The final determination is carried out in a processing unit, for example the DSP 15 of the GPS receiver 12.

The number of the correlators in the supplementary correlator bank 22 can be sufficiently large for processing all search options which may be output by the massive correlator bank 21 in parallel. Alternatively, a quality indication may be assigned to each search option. In case none of the correlators of the supplementary correlator bank 22 is free when a new search option is output by the massive correlator bank 21, the quality indication associated to the current search option is compared to a quality indication which was associated to previous search options now occupying the correlators of the supplementary correlator bank 22. In case a higher quality grade was associated to the new search option than to one of the search options currently processed in one of the correlators of the supplementary correlator bank 22, then the corresponding correlator of the supplementary correlator bank 22 will stop processing the previously assigned search option and start processing the new search option.

The supplementary correlator bank 22 can be implemented in various forms, three of which will be presented by way of example in the following with reference to FIGS. 4 to 9.

It is to be noted that the exact structure of the massive correlator bank 21 is not of importance. The focus lies on the distribution of tasks between the massive correlator bank 21 and the supplementary correlator bank 22 and the structure of the supplementary correlator bank 22. Also different parallel solutions, concerning the temporal and spatial dimensions, can be used to implement the correlators in the massive correlator bank 21 and the supplementary correlator bank 22.

Figure 4:
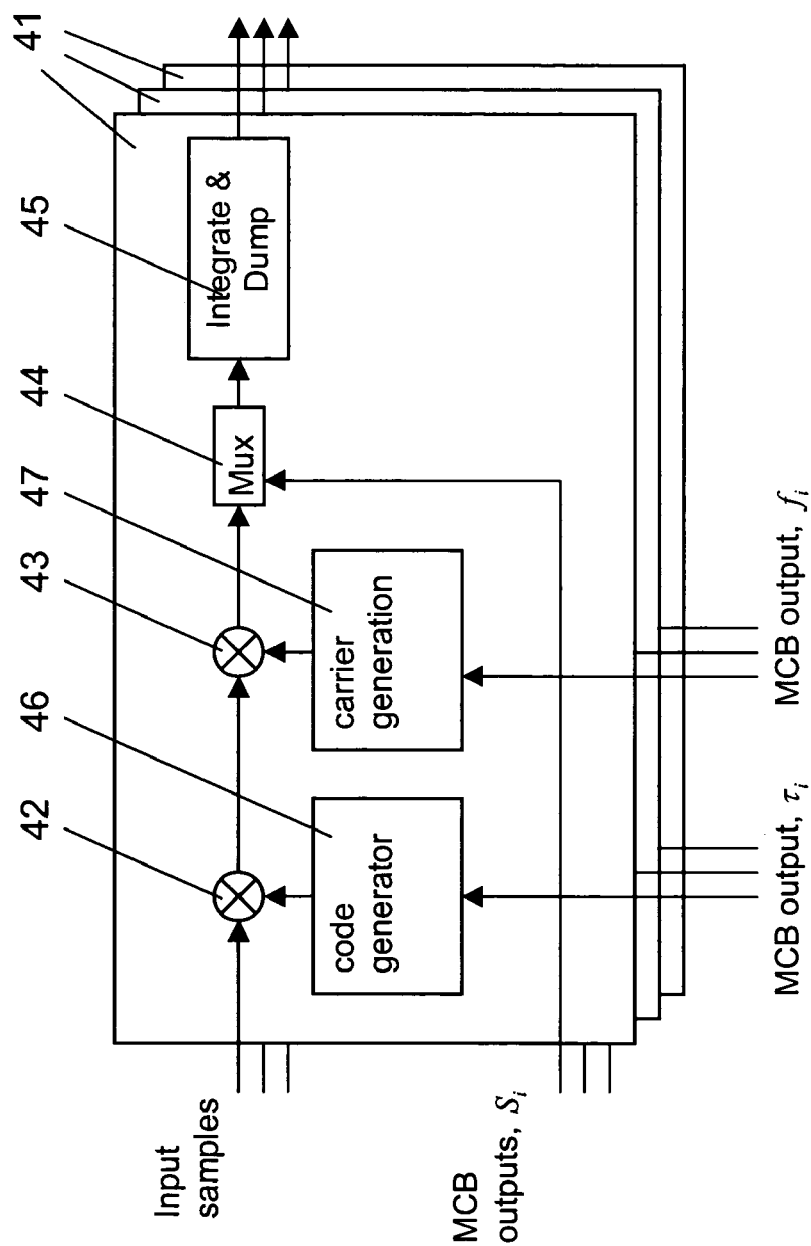
FIG. 4 is a schematic block diagram of a first embodiment of the supplementary correlation bank employed in the structure of FIG. 2.

FIG. 4 is a schematic block diagram of a first embodiment of a supplementary correlator bank 22 in the structure of FIG. 2.

The supplementary correlator bank 22 of FIG. 4 comprises a plurality of correlators 41. In each correlator 41, a sample input is connected via two subsequent multiplication elements 42, 43 and a multiplexer 44 to an integrating portion 45. Moreover, a code-phase indication input is connected to an input of a code generator 46. The output of the code generator 46 is connected to the first multiplication element 42. In addition, a frequency indication input is connected to an input of a carrier generator 47. The output of the carrier generator 47 is connected to the second multiplication element 43. Finally, an integration result input is connected to the multiplexer 44.

Figure 5:
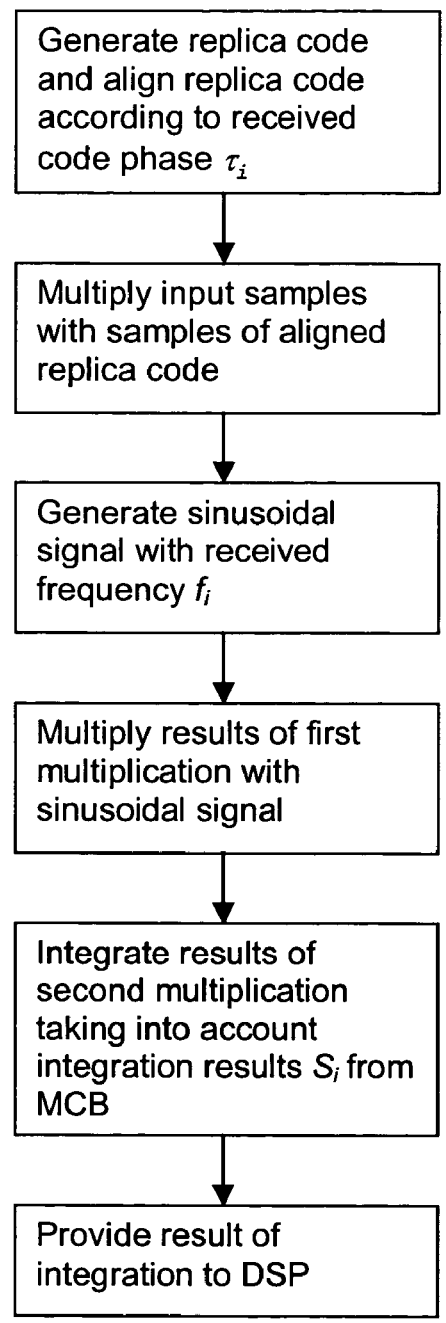
FIG. 5 is a flow chart illustrating the operation of the supplementary correlation bank of FIG. 4.

The operation of the supplementary correlator bank 22 of FIG. 4 is illustrated in the flow chart of FIG. 5.

The supplementary correlator bank 22 assigns each search option received from the massive correlator bank 21 to a specific one of its correlators 41. The search option comprises an indication of a specific code-phase $\tau_i$, which is fed to the code-phase indication input of the respective correlator 41, and a specific frequency $f_i$, which is fed to the frequency indication input of the respective correlator 41.

The result $s_i$ of a coherent integration associated to the search option is provided to the integration result input of the correlator 41. The integration result $S_i$ is the result of a coherent integration at the massive correlator bank 21.

The code-phase indication $\tau_i$ is fed within the correlator 41 to the code generator 46, which generates a replica code sequence and aligns it according to the indicated code-phase. The received input samples are then multiplied by the first multiplication element 42 element-wise with the respectively aligned samples of the replica code sequence, as far as they have not been used already in the massive correlator bank 21.

The frequency indication $f_i$ is fed within the correlator 41 to the carrier generator 47, which generates a corresponding sinusoidal signal. The second multiplication element 43 multiplies the samples output by the first multiplication element 42 element-wise with the sinusoidal signal generated by the carrier generator 47.

It is to be noted that the order of the two different multiplication operations by the first multiplication element 42 and the second multiplication element 43 can also be reversed.

The output of the second multiplication element 43 and the result of the coherent integration $S_i$ are provided via the multiplexer 44 to the integrating portion 45.

The integrating portion 45 integrates the multiplication results and includes in the integration as well the integration result $S_i$ provided by the massive correlator bank 21. The integration may consist in a coherent accumulation, but it may include as well a non-coherent accumulation, as described above as second alternative for the integration in the massive correlator bank 21. If the final integration result lies below a predetermined threshold, the result is dumped. Otherwise, the final integration result is provided to some processing means, for instance to the DSP 15, for determining the best correlation result for all search options. Then, the correlator 41 is released for a refined correlation based on the next search option.

Figure 6:
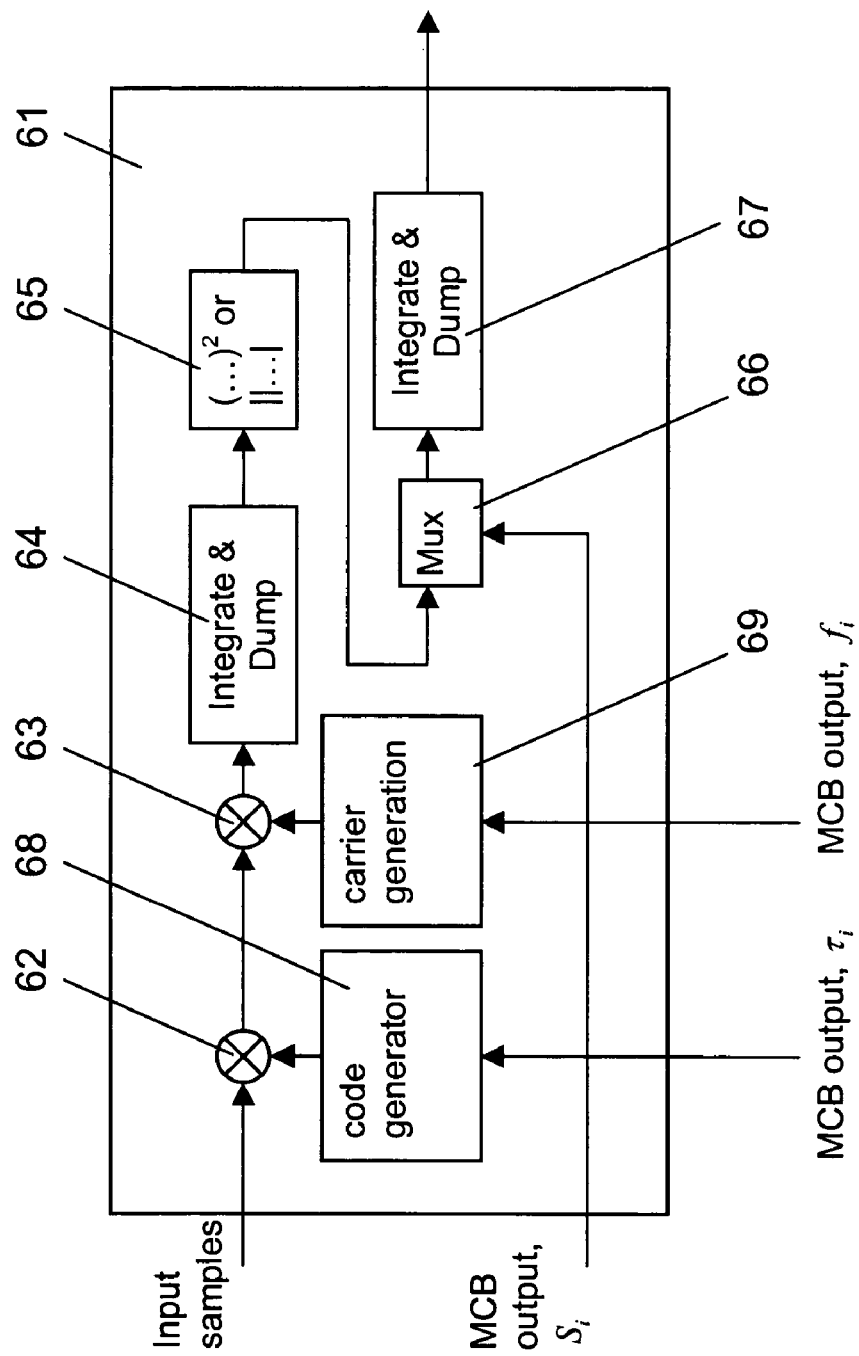
FIG. 6 is a schematic block diagram of a second embodiment of the supplementary correlation bank employed in the structure of FIG. 2.

FIG. 6 is a schematic block diagram of a second embodiment of a supplementary correlator bank 22 in the structure of FIG. 2.

The supplementary correlator bank 21 of FIG. 6 comprises again a plurality of correlators 61, of which only one is shown. In each correlator 61, a sample input is connected via two subsequent multiplication elements 62, 63 to an integrating portion 64. The integrating portion 64 is further connected via a portion 65 forming absolute or square values of input values and via a multiplexer 66 to a second integrating portion 67. Further, a code-phase indication input is connected to an input of a code generator 68. The output of the code generator 68 is connected to the first multiplication element 62. A frequency indication input is connected to an input of a carrier generator 69. The output of the carrier generator 69 is connected to the second multiplication element 63. Finally, an integration result input is connected to the multiplexer 66.

Figure 7:
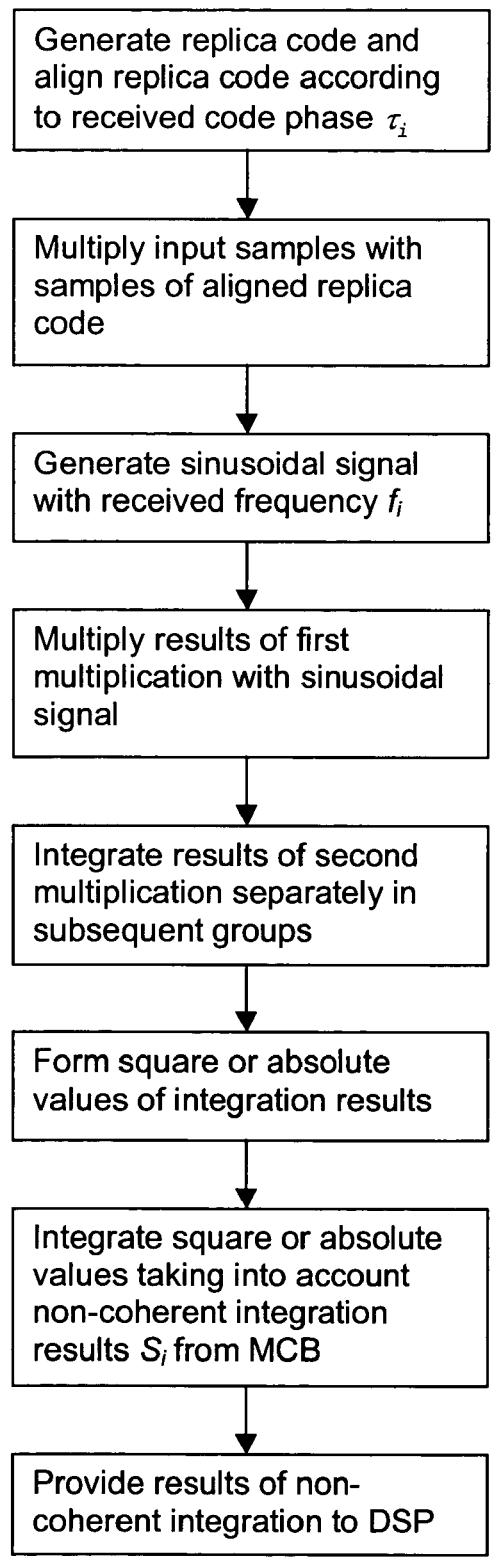
FIG. 7 is a flow chart illustrating the operation of the supplementary correlation bank of FIG. 6.

The operation of the supplementary correlator bank 22 of FIG. 6 is illustrated in the flow chart of FIG. 7.

The supplementary correlator bank 22 assigns each search option received from the massive correlator bank 21 to a specific one of its correlators 61. The search option comprises an indication of a specific code-phase $\tau_i$, which is fed to the code-phase indication input of the respective correlator 61, and a specific frequency $f_i$, which is fed to the frequency indication input of the respective correlator 61. The result $s_i$ of a coherent integration associated to the search option is provided to the integration result input of the respective correlator 61. The integration result $S_i$ is the result of a non-coherent integration at the massive correlator bank 21.

The code-phase indication $\tau_i$ and the frequency indication $f_i$ are made use of by the code generator 68 and the carrier generator 69 as described with reference to FIG. 4 for code generator 46 and the carrier generator 47, respectively. Also the output of the code generator and of the carrier generator is made use of in the multiplication elements 62, 63 as described with reference to FIG. 4 for multiplication elements 42, 43, respectively.

The output of the second multiplication element 63 is provided to the integrating portion 64. The integrating portion 64 integrates subsequent groups of multiplication results provided by the second multiplication element 63 separately. Portion 65 determines the square value or the absolute value of each integration result.

The square values or the absolute values, respectively, and the non-coherent integration result $S_i$ provided by the massive correlator bank 21 are provided via the multiplexer 66 to the second integrating portion 67. In the second integrating portion 67, the square values or the absolute values, respectively, are integrated in a non-coherent integration, the non-coherent integration result $S_i$ of the massive correlator bank 21 being included in this second integration.

If the final non-coherent integration result lies below a predetermined threshold, the result is dumped. Otherwise, the final non-coherent integration result is provided to some processing means, for instance to the DSP 15, for determining the best correlation result for all search options. Then, the correlator 61 is released for a refined correlation based on the next search option.

Figure 8:
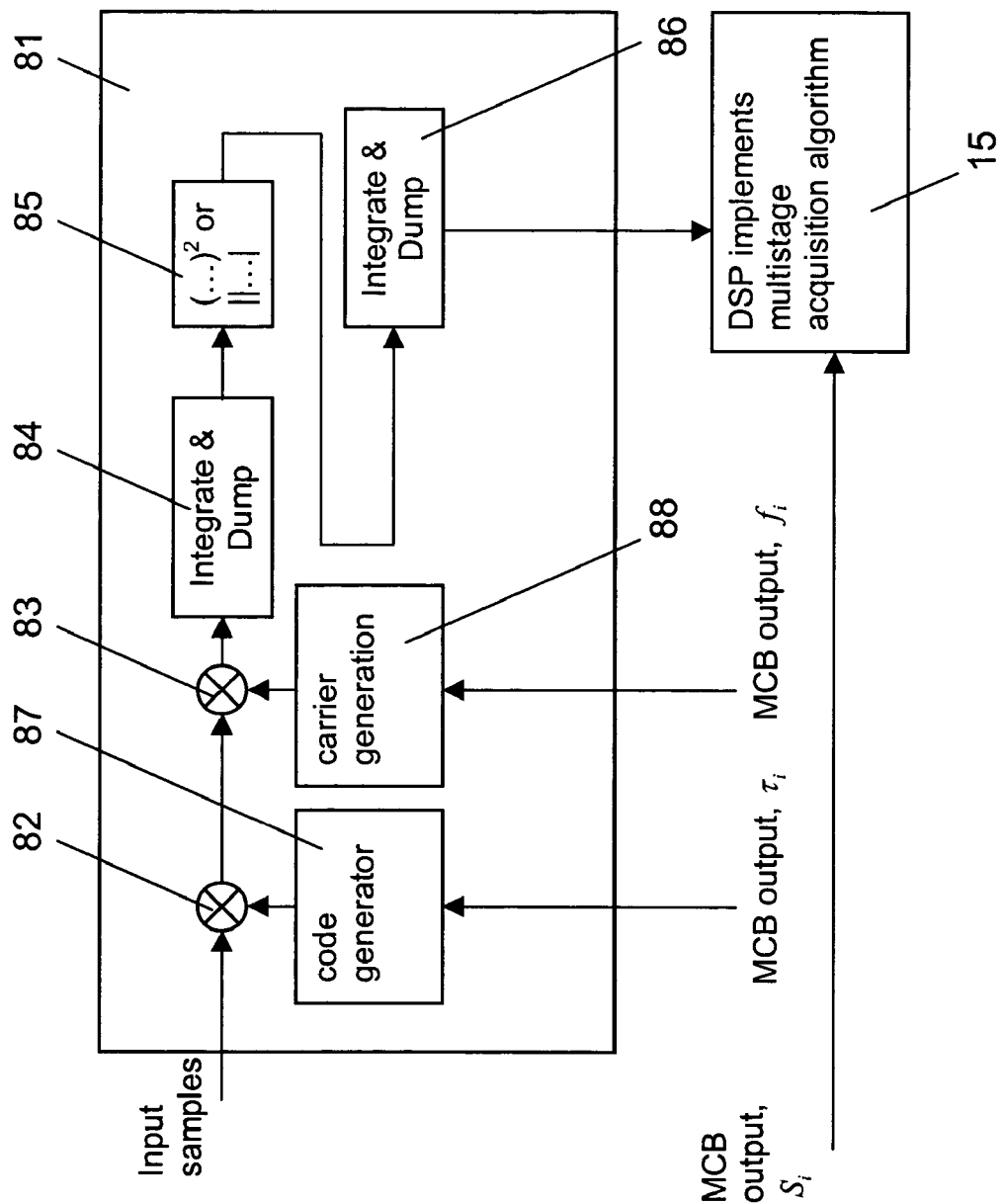
FIG. 8 is a schematic block diagram of a third embodiment of the supplementary correlation bank employed in the structure of FIG. 2, which is cooperating with a DSP.

FIG. 8 is a schematic block diagram of a third embodiment of a supplementary correlator bank in the structure of FIG. 2.

The supplementary correlator bank 21 of FIG. 8 comprises again a plurality of correlators 81, of which only one is shown. In each correlator 81, a sample input is connected via two subsequent multiplication elements 82, 83 to an integrating portion 84. The integrating portion 84 is further connected via a portion 85 forming absolute or square values of input values to a second integrating portion 86. Further, a code-phase indication input is connected to an input of a code generator 87. The output of the code generator 87 is connected to the first multiplication element 82. Moreover, a frequency indication input is connected to an input of a carrier generator 88. The output of the carrier generator 88 is connected to the second multiplication element 83.

The second integrating portion 86 is connected via an output of the correlator 81 to the DSP 15 of the GPS receiver 12. Also the massive correlator bank 21 is connected to the DSP 15.

Figure 9:
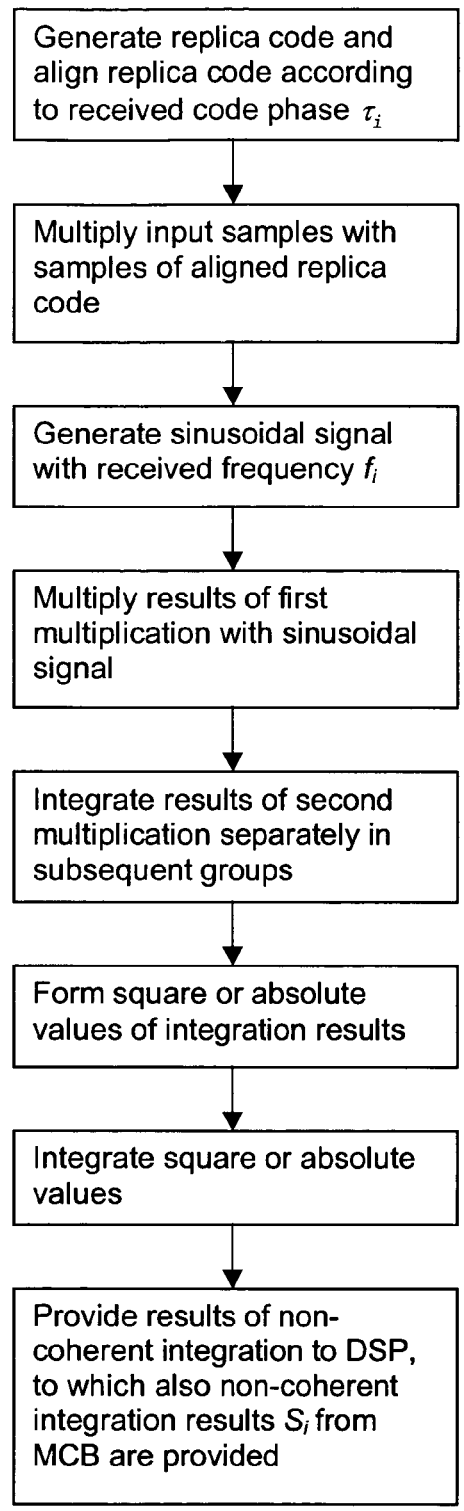
FIG. 9 is a flow chart illustrating the operation of the supplementary correlation bank of FIG. 8.

The operation of the supplementary correlator bank 22 of FIG. 8 is illustrated in the flow chart of FIG. 9.

The operation of the correlator 81 of the supplementary correlator bank 22 of FIG. 8 is the same as the operation of the correlator 61 of the supplementary correlator bank 22 of FIG. 6, except that the second integrating portion 86 does not include any integration results from the massive correlator bank 21 in the non-coherent integration.

Non-coherent integration results $S_i$ of the massive correlator bank for each search option are rather provided directly to the DSP 15.

The DSP 15 uses the non-coherent integration results $S_i$ from the massive correlator bank 21 and from the supplementary correlator bank 22 in a multistage acquisition algorithm for the final signal acquisition. Such an algorithm has been described for example by Kaplan.

Alternatively, the DSP 15 shown in FIG. 8 and in FIG. 1 could also be part of the mobile terminal 11 outside of the GPS receiver 12, or be implemented in the mobile communication network 16. In the latter case, the integration results of the supplementary correlator bank 22 and, in the case of FIG. 8, of the massive correlator bank 21 are transmitted to the mobile communication network 16 making use of the regular communication abilities of the mobile terminal 11.

In cases in which the mobile communication network 16 provides assistance data to the mobile terminal 11, the search options may already be limited due to this assistance data, so that the entire acquisition may be performed by the supplementary correlator bank 22. Such assistance data may comprise for example information on the positions of the GPS satellites 19 and on a rough position of the mobile terminal 11, which limits the possible code phases. The massive correlator bank 21 can then be switched off in order to reduce the power consumption.

While there have shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus supporting an acquisition of a received code modulated signal by determining the correlation between said received code modulated signal and an available replica code sequence at different code phases relative to each other, said apparatus comprising:
a first acquisition engine for selecting code phases which are good candidates for being the code phase at which a received code modulated signal and said available replica code sequence have the highest correlation, and for outputting information on each selected code phase; and
a second acquisition engine for receiving information on selected code phases from said first acquisition engine and for performing a refined comparison between a received code modulated signal and an available replica code sequence for each selected code phase on which information is received,
wherein said first acquisition engine is adapted to select said code phases as part of a respectively selected set of a code phase and a frequency employed for a frequency compensation of said received code modulated signal, said first acquisition engine providing information on each selected set, and wherein said second acquisition engine is adapted to perform said refined comparison between a received code modulated signal and an available replica code sequence for the code phase of each set on which information is received and with a frequency compensation of said received code modulated signal using the frequency belonging to the respective set.

2. An apparatus according to claim 1, wherein for selecting a specific set comprising a given code-phase and a given frequency, said first acquisition engine is adapted to
multiply said received code modulated signal with a sinusoidal signal having said given frequency;
align said received code modulated signal with said replica code sequence at said given code-phase;
multiply selected samples of said received code modulated signal with aligned samples of said replica code sequence;
perform an integration of the results of the second multiplication; and
select said set comprising said given code-phase and said given frequency in case the result of said integration exceeds a predetermined threshold value.

3. An apparatus according to claim 2, wherein said first acquisition engine is adapted to perform said integration at least as one of a coherent and a non-coherent integration of said results of said second multiplication.

4. An apparatus according to claim 2, wherein for said refined comparison, said second acquisition engine is adapted to
align said received code modulated signal with said replica code sequence at a code-phase belonging to a selected set on which information is received;
multiply selected samples of said received code modulated signal with aligned samples of said replica code sequence;
multiply the multiplication result with a sinusoidal signal which has a frequency belonging to said selected set; and
perform an integration of the results of said second multiplication.

5. An apparatus according to claim 4, wherein said second acquisition engine is adapted to performs said integration as at least one of a coherent and a non-coherent integration.

6. An apparatus according to claim 4, wherein said first acquisition engine is further adapted to provide the result of an integration, which is associated in said selection to a selected set, to said second acquisition engine, and wherein said second acquisition engine is adapted to perform said integration for said refined comparison taking into account an integration result provided by said first acquisition engine.

7. An apparatus according to claim 4, further comprising a processing unit for processing integration results determined by said second acquisition engine, in order to acquire a received code modulated signal.

8. An apparatus according to claim 4, further comprising a processing unit for processing integration results determined by said first acquisition engine, which integration results are associated to a selected set, and integration results determined by said second acquisition engine, in order to acquire a received code modulated signal.

9. A system comprising a network and an apparatus, which network and which apparatus support an acquisition of a code modulated signal received at said apparatus by determining the correlation between said received code modulated signal and an available replica code sequence at different code phases relative to each other, wherein said network and said apparatus are adapted to exchange data with each other, said apparatus comprising:
a first acquisition engine for selecting code phases which are good candidates for being the code phase at which said received code modulated signal and an available replica code sequence have the highest correlation, and for outputting information on each selected code phase; and a second acquisition engine for receiving information on selected code phases from said first acquisition engine and for performing a refined comparison between a received code modulated signal and an available replica code sequence for each selected code phase on which information is received, wherein said network comprises a processing unit for processing at least results of said refined comparison in said second acquisition engine in order to acquire a received code modulated signal.

10. A system comprising a network and an apparatus, which network and which apparatus support an acquisition of a code modulated signal received at said apparatus by determining the correlation between said received code modulated signal and an available replica code sequence at different code phases relative to each other, wherein said network and said apparatus are adapted to exchange data with each other, said apparatus comprising:

a first acquisition engine for selecting code phases which are good candidates for being the code phase at which said received code modulated signal and an available replica code sequence have the highest correlation, and for outputting information on each selected code phase; and a second acquisition engine for receiving information on selected code phases from said first acquisition engine and for performing a refined comparison between a received code modulated signal and an available replica code sequence for each selected code phase on which information is received, wherein said network is adapted to provide assistance data related to received code modulated signal to said apparatus, which assistance data supports said second acquisition engine in said refined comparison.

11. A method for supporting an acquisition of a received code modulated signal by determining the correlation between said received code modulated signal and an available replica code sequence at different code phases relative to each other, said method comprising:

selecting code phases which are good candidates for being the code phase at which a received code modulated signal and an available replica code sequence have the highest correlation; and performing a refined comparison between said received code modulated signal and said available replica code sequence for each of said selected code phases, wherein selecting said code phases comprises selecting a respective set of said code phase and a frequency employed for a frequency compensation of said received code modulated signal, and wherein performing said refined comparison comprises comparing said received code modulated signal and said available replica code sequence for the code phase of each selected set and with a frequency compensation of said received code modulated signal using the frequency belonging to the respective set.

12. A method according to claim 11, wherein selecting a specific set with a given code-phase and a given frequency comprises multiplying said received code modulated signal with a sinusoidal signal having said given frequency;

aligning said received code modulated signal with said replica code sequence at said given code-phase;

multiplying selected samples of said received code modulated signal with aligned samples of said replica code sequence;

performing an integration of the results of said second multiplication; and selecting said set with said given code-phase and said given frequency in case the result of said integration exceeds a predetermined threshold value.

13. A method according to claim 12, wherein said integration of said results of said second multiplication is at least as one of a coherent and a non-coherent integration.

14. A method according to claim 12, wherein performing said refined comparison comprises:

aligning said received code modulated signal with said replica code sequence at a code-phase belonging to a selected set;

multiplying selected samples of said received code modulated signal with aligned samples of said replica code sequence;

multiplying the multiplication result with a sinusoidal signal which has a frequency belonging to said selected set; and performing an integration of the results of said second multiplication.

15. A method according to claim 14, wherein said integration for said refined comparison is at least one of a coherent and a non-coherent integration.

16. A method according to claim 14, wherein performing an integration of the results of said second multiplication in said refined comparison comprises taking into account integration result occurring in said selection of said selected set.

17. A method according to claim 16, wherein integration results occurring in said refined comparison are further processed in a processing unit in order to acquire a received code modulated signal.

18. A method according to claim 14, wherein integration results associated to a selected set in said selection of sets and integration results occurring in said refined comparison are further processed in a processing unit in order to acquire a received code modulated signal.

* * * * *